(12) United States Patent
Mansingh

(10) Patent No.: US 8,327,044 B2
(45) Date of Patent: Dec. 4, 2012

(54) TRANSACTION ID FILTERING FOR BUFFERED PROGRAMMED INPUT/OUTPUT (PIO) WRITE ACKNOWLEDGEMENTS

(75) Inventor: Sanjay Mansingh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/222,531

(22) Filed: Aug. 31, 2011

(65) Prior Publication Data

US 2011/0314189 A1 Dec. 22, 2011

Related U.S. Application Data

(63) Continuation of application No. 12/637,338, filed on Dec. 14, 2009, now Pat. No. 8,032,673.

(51) Int. Cl.
*G06F 3/00* (2006.01)
*G06F 5/00* (2006.01)
(52) U.S. Cl. .......................................... 710/52; 711/118
(58) Field of Classification Search ...................... 710/52
See application file for complete search history.

(56) References Cited

U.S. PATENT DOCUMENTS

| | | | |
|---|---|---|---|
| 6,009,478 A * | 12/1999 | Panner et al. ...................... | 710/5 |
| 6,721,799 B1 | 4/2004 | Slivkoff | |
| 7,133,943 B2 | 11/2006 | Carnevale | |
| 7,251,711 B2 * | 7/2007 | Roohparvar .................. | 711/154 |
| 7,562,366 B2 | 7/2009 | Pope | |
| 7,644,220 B2 | 1/2010 | Moriyama | |
| 7,730,077 B2 | 6/2010 | Hinshaw et al. | |
| 7,788,413 B1 * | 8/2010 | Justiss et al. ...................... | 710/5 |
| 2002/0156943 A1 * | 10/2002 | Ishimura et al. ................... | 710/5 |
| 2005/0223136 A1 * | 10/2005 | Tanaka et al. .................... | 710/22 |

* cited by examiner

*Primary Examiner* — Elias Mamo
(74) *Attorney, Agent, or Firm* — Lawrence J. Merkel; Stephen J. Curran; Meyertons, Hood, Kivlin, Kowert & Goetzel, P.C.

(57) ABSTRACT

A PIO transaction unit includes an input buffer, a response buffer, and a control unit. The input buffer may receive and store PIO write operations sent by one or more transactions sources. Each PIO write operation may include a source identifier that identifies the transaction source. The response buffer may store response operations corresponding to respective PIO write operations that are to be transmitted to the transaction source identified by the source identifier. The control unit may store a particular response operation corresponding to the given PIO write operation in the response buffer prior to the given PIO write operation being sent from the input buffer. The control unit may store the particular response operation within the response buffer if the given PIO write operation is bufferable and there is no non-bufferable PIO write operation having a same source identifier stored in the input buffer.

20 Claims, 4 Drawing Sheets

TRANSACTION ID FILTERING FOR BUFFERED PROGRAMMED INPUT/OUTPUT (PIO) WRITE ACKNOWLEDGEMENTS

This application is a continuation of U.S. patent application Ser. No. 12/637,338, entitled "Transaction ID Filtering for Buffered Programmed Input/Output (PIO) Write Acknowledgements", filed Dec. 14, 2009 now U.S. Pat. No. 8,032,673.

BACKGROUND OF THE INVENTION

1. Field of the Invention

This invention relates to digital processing systems and, more particularly, to programmed I/O mechanisms in such systems.

2. Description of the Related Art

Programmed input/output (PIO) transactions may be used to access the I/O space of an I/O device or peripheral. More particularly, PIO transactions may be used, for example, to write to configuration space registers in one or more I/O devices or peripherals, or to access an I/O device's memory.

In many systems, although PIO transactions are necessary, there may be issues when performing PIO transactions. For example, in many cases, a processor may perform a PIO write and then wait for an acknowledgement. In some systems the processor may be stalled while the PIO write is completing and prior to an acknowledgement being received. This may be particularly problematic when a processor is configuring a device for the first time, or reconfiguring a device, and the processor sends a burst of PIO writes. Accordingly, PIO transaction acknowledgement latency can be an important issue. However, trying to balance these latencies along with transaction ordering and PIO error reporting can be difficult in conventional systems.

SUMMARY

Various embodiments of a PIO transaction unit including transaction ID filtering are disclosed. In one embodiment, the PIO transaction unit includes an input buffer or queue, a response buffer, and a control unit. The input buffer may be configured to receive and store a plurality of PIO write operations that are sent by one or more transactions sources such as a processor or other I/O master, for example. Each PIO write operation may include a source identifier that identifies the transaction source. The response buffer may be configured to store response operations corresponding to respective PIO write operations that are to be transmitted to the transaction source identified by the source identifier. As each PIO write operation is received, the control unit may be configured to determine whether a given PIO write operation is bufferable or non-bufferable, and whether there are any non-bufferable write operations having the same source identifier in the input buffer. If the given PIO write operation is bufferable, the control unit may be configured to store in the response buffer a particular response operation corresponding to the given PIO write operation prior to the given PIO write operation being sent to a target of the given PIO write operation. The control unit may store the particular response operation within the response buffer in response to determining that the given PIO write operation is a bufferable PIO write operation and that there is no non-bufferable PIO write operation having a same source identifier stored in the input buffer.

Figure 1:
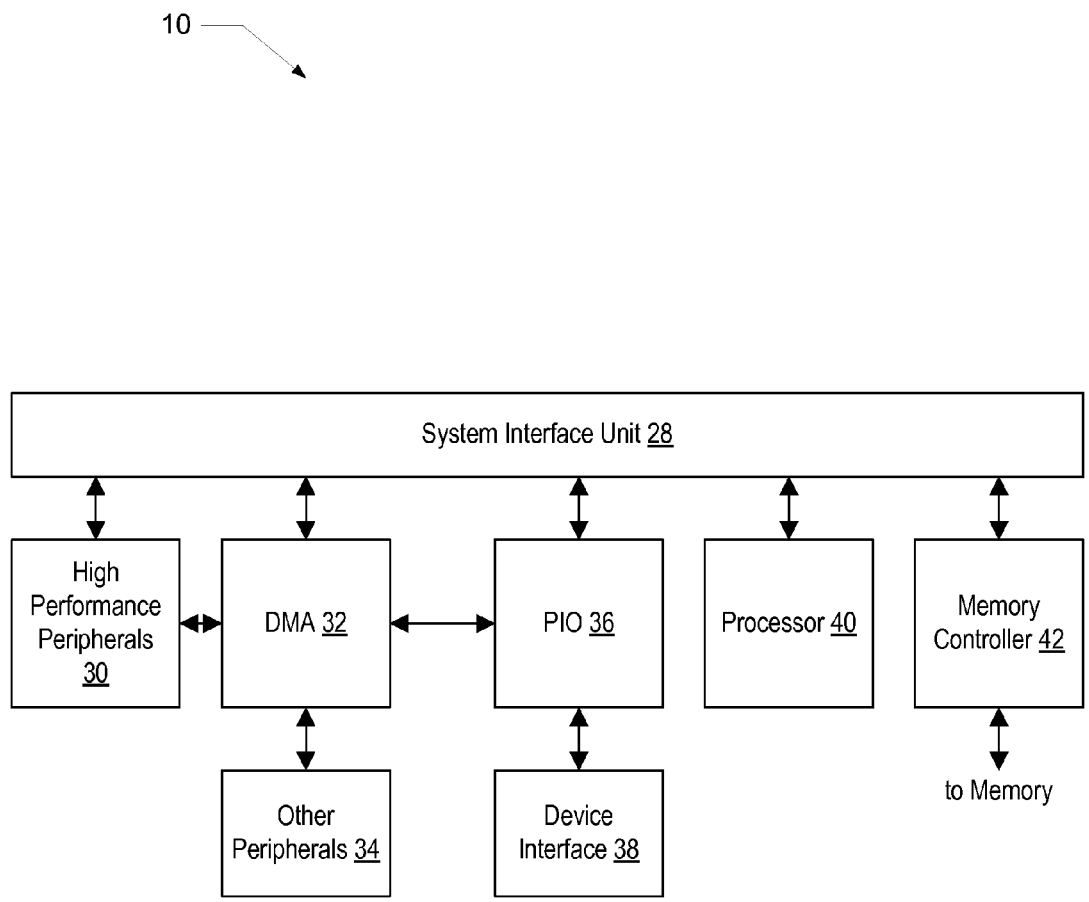
FIG. 1 is a block diagram of one embodiment of an integrated circuit system including a PIO unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

Turning now to FIG. 1, a block diagram of one embodiment of an integrated circuit (IC) system 10 is shown. The system 10 includes a system interface unit (SIU) 28, high performance peripherals 30, a direct memory access (DMA) unit 32, one or more other peripherals 34, a PIO unit 36, a device interface 38, a processor 40, and a memory controller 42.

As shown in FIG. 1, the SIU 28 is coupled to the high performance peripherals 30, the DMA unit 32, the PIO unit 36, the processor 40, and the memory controller 42. The DMA unit 32 is coupled to the high performance peripherals 30, the PIO unit 36 and the other peripherals 34. The PIO unit 36 is also coupled to the device interface 38. The memory controller 42 is coupled to a memory (not shown). In one embodiment, the IC system 10 as illustrated in FIG. 1 may be integrated onto a single integrated circuit chip as a system-on-a-chip (SOC). In other embodiments, two or more integrated circuits may be employed to provide the components illustrated in FIG. 1. In other embodiments, the IC system 10 may further include various other components (e.g. components coupled to the SIU 28).

The PIO unit 36 may receive and handle PIO transactions initiated by one or more of the I/O masters that may be coupled to the SIU 28. For example, in one embodiment, the processor 40 may initiate PIO transactions and the PIO unit 36 may maintain the order of PIO operations and their responses. Further, as described in greater detail below, the PIO unit 36 may be configured to bypass responses for certain types of PIO write operations depending upon the transaction ID and whether the transaction request is bufferable or not.

The system interface unit 28 may be a "top level" interface connecting the various components of the system 10 and providing communication therebetween. The SIU 28 may include an interconnect that provides an address, a data, and a write response interconnect (not shown) to couple to other components in the system 10.

The high performance peripherals 30 may include various peripherals that are expected to generate significant bandwidth on the SIU 28, at least as compared to the other peripherals in the system 10. For example, in one embodiment, the high performance peripherals 30 may include a networking media access controller (MAC) such as an Ethernet MAC, a wireless fidelity (WiFi) controller, and a universal serial bus (USB) controller. Other embodiments may include more or fewer peripherals, and may categorize and/or arrange the peripherals differently. For example, the MAC and USB controller may be medium performance peripherals, whereas the WiFi controller may be a low performance peripheral. The other peripherals 34 may include various lower bandwidth peripherals such as an audio subsystem, flash memory interface, general purpose input/output (I/O), timers, an on-chip secrets memory, an encryption engine, etc., or any combination thereof. The DMA unit may be configured to perform transfers to and from the memory through the memory controller 42 on behalf of the other peripherals 34. The device interface 38 may provide an interface to a number of control and status registers for devices such as boot memory, a power management unit, interrupt controllers, and others.

The processor 40 may implement any instruction set architecture, and may be configured to execute instructions in that instruction set architecture. The processor 40 may employ any microarchitecture, including scalar, superscalar, pipelined, superpipelined, out of order, in order, speculative, non-speculative, etc., or combinations thereof. The processor 40 may include circuitry, and optionally may implement microcoding techniques.

The memory controller 42 may be configured to receive memory requests from the system interface unit 28 (which may have received the requests from one or more other components as shown in FIG. 1). The memory controller 42 may access memory to complete the requests (writing received data to the memory for a write request, or providing data from the memory in response to a read request). The memory controller 42 may be configured to interface with any type of memory, such as dynamic random access memory (DRAM), synchronous DRAM (SDRAM), double data rate (DDR, DDR2, DDR3, etc.) SDRAM, RAMBUS DRAM (RDRAM), static RAM (SRAM), etc. The memory may be arranged as multiple banks of memory, such as dual inline memory modules (DIMMs), etc.

It is noted that other embodiments may include other combinations of components, including subsets or supersets of the components shown in FIG. 1 and/or other components. While one instance of a given component may be shown in FIG. 1, other embodiments may include one or more instances of the given component. In addition, in other various embodiments, other components that may be coupled to the system interface unit 28, or portions of the other components, may also be coupled through an interface unit (not shown).

Figure 2:
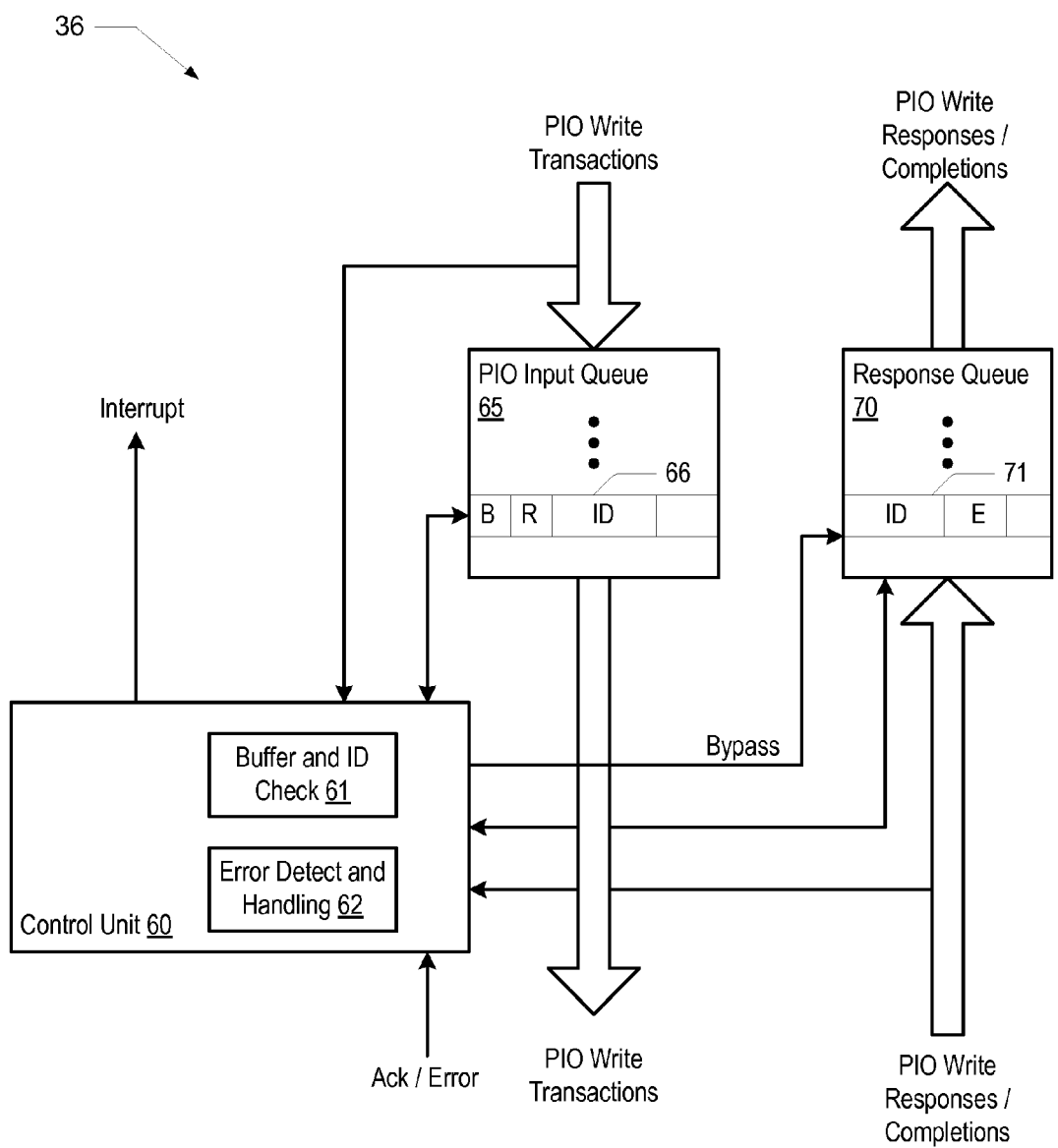
FIG. 2 is a block diagram of one embodiment of the PIO unit shown in FIG. 1.

Turning now to FIG. 2, a block diagram of one embodiment of the PIO unit 36 of FIG. 1 is shown. The PIO unit 36 includes a control unit 60 coupled to a PIO input queue 65 and to a response queue 70. As shown, the control unit 60 includes a buffer and ID check unit 61, and an error detect and handling unit 62.

The PIO input queue 65 includes a number of entries (as indicated by the ellipsis) and is configured to receive PIO write operations from upstream and to store each one in respective entry (e.g., entry 66) within the PIO input queue 65. The PIO input queue 65 is also configured to send PIO write operations downstream to the DMA unit 32 and the device interface 38, for example. In one embodiment, the PIO input queue 65 may be implemented as a first-in-first-out (FIFO) buffer. An exemplary entry 66 is shown within the PIO input queue 65. As shown, entry 66 includes a number of fields. The first field from the left is the bufferable/non-bufferable field, which is denoted by the 'B' and may indicate whether the transaction is bufferable. In addition, entry 66 includes a response field, denoted by an 'R', and may indicate that a response corresponding to the entry has already been placed in the response queue (i.e., bypassed). The entry 66 also includes a transaction identifier 'ID' field, which may be used to identify the source of the PIO write operation. It is noted that in other embodiments, there may be other fields that are not shown (e.g., data) for simplicity.

The response queue 70 includes a number of entries (as indicated by the ellipsis) and is configured to receive, from downstream, responses to the PIO write operations. The response queue 70 may also be configured to send the responses upstream to the I/O master that initiated the corresponding PIO write operation. The response queue 70 is configured to store each response in an entry such as entry 71. In one embodiment, the response queue 65 may be implemented as a FIFO buffer. An exemplary entry 71 is shown within the response queue 70. As shown, each response queue entry 71 includes a number of fields. The first field from the left is a transaction ID field, which identifies the source of the PIO write operation, and which is the target of the response. The next field is an error field, denoted with an 'E', which may indicate the presence of an error. It is noted that in other embodiments, there may be other fields that are not shown in the illustration for simplicity.

The PIO unit 36 may control PIO transactions by responding to PIO write operations that are issued on the SIU 28. Accordingly, in one embodiment, the control unit 60 may detect PIO write operations on the SIU 28. The control unit 60 may capture the address and the transaction source ID, the bufferable bit, and any write data, and store the operation into an entry of the PIO input queue 65. In addition, the buffer and ID check unit 61 may determine whether the write operation is bufferable using the indication in the B field. To facilitate ordering rules among transactions with the same ID, the buffer and check unit 61 may include comparison logic to determine whether any non-bufferable transactions may be stored in the PIO input queue 65 that have the same transaction ID as the received bufferable transaction.

In one embodiment, the control unit 60 may be configured to cause a corresponding response to be stored within an entry in the response queue 70 if a received operation is bufferable and there are no non-bufferable transactions with the same ID as the received bufferable operation stored in the PIO input queue 65, prior to the received write operation being sent to the target. More particularly, in one implementation, the control unit 60 may "bypass" the normal period of waiting for a response/completion acknowledgement by storing a response that corresponds to the received bufferable transaction within the response queue 70 and marking the 'R' field of the corresponding entry in the PIO input queue 65. Accordingly, when that response reaches the head of the response queue 70, the response may be issued to the PIO write transaction source before the completion is even received from the target device.

However, for non-bufferable transactions, and bufferable transactions that have been "demoted" because there are non-bufferable operations with the same ID already in the PIO input queue 65, responses are stored within the response queue 70 when they are received from the target device to which the write operation was sent.

In the event that an error occurs, such as at the target device, the target device may notify the PIO unit 36 using one or more signals. The control unit 60 may store a corresponding response entry within the response queue 70 with the 'E' field indicating an error. Under normal conditions (i.e., a response was not already bypassed to the response queue 70), that response will be sent to the I/O master that issued the associated PIO write operation when it reaches the head of the response queue 70. However, in one embodiment, if the response was bypassed and already sent, the error detect and handling unit 62 may detect the error and issue an interrupt to the I/O master that issued the associated PIO write operation. Although unlikely, if the response is still in the response queue 70, the 'E' field of that entry may be changed to indicate the error.

Figure 3:
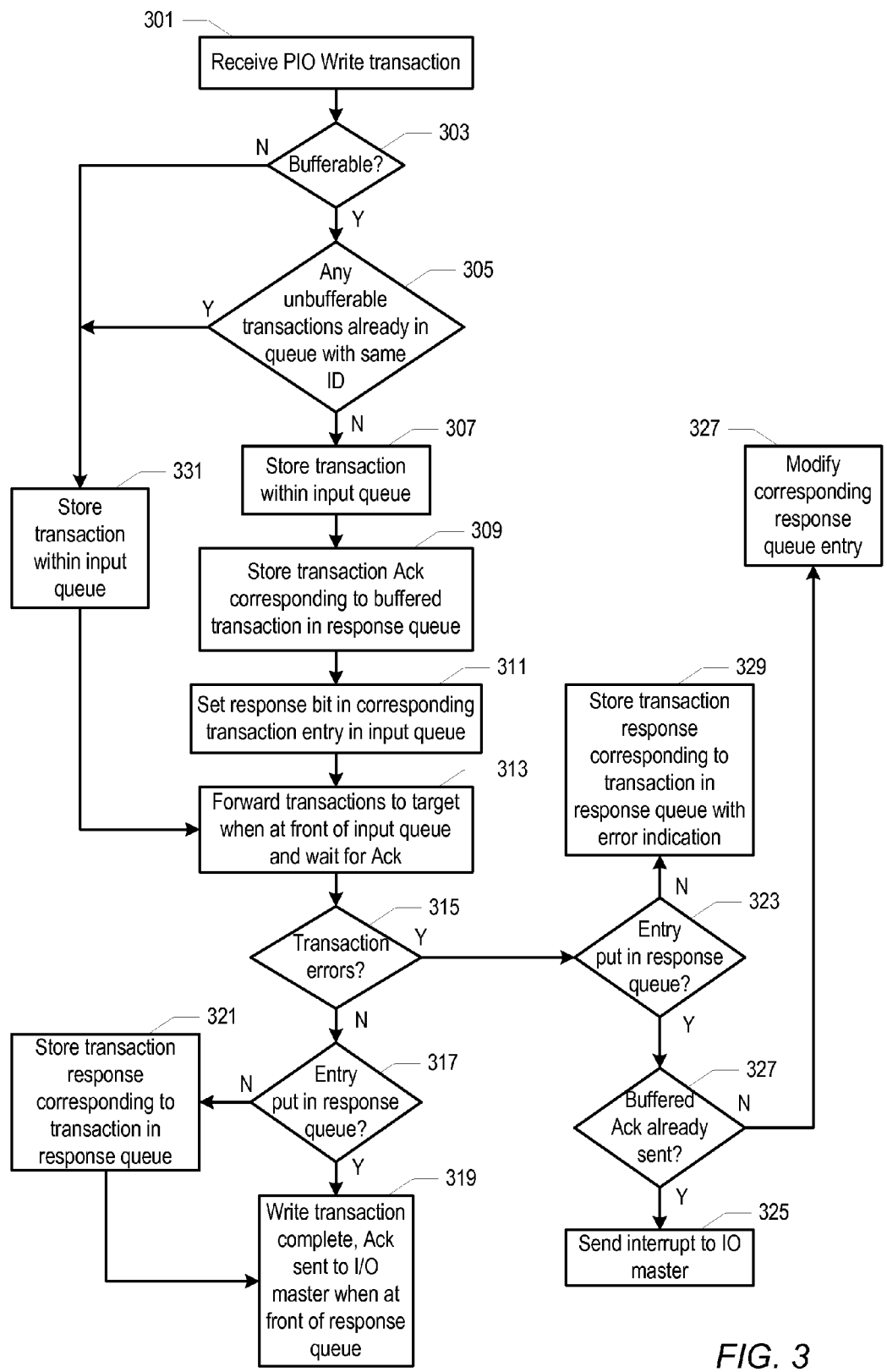
FIG. 3 is flow diagram depicting the operation of one embodiment of the PIO unit shown in FIG. 1 and FIG. 2.

FIG. 3 is flow diagram depicting the operation of one embodiment of the PIO unit shown in FIG. 1 and FIG. 2. Referring collectively to FIG. 1 through FIG. 3, and beginning in block 301 of FIG. 3, the PIO unit 36 receives a PIO write operation. In one embodiment, the PIO unit 36 detects the PIO write operation on the SIU 28. The buffer and ID check unit 61 of control unit 60 inspects the operation to determine whether the operation is bufferable by inspecting the state of the 'B' field. In one embodiment, the 'B' field may be a single bit, which if set, indicates the transaction is bufferable. If the write is not bufferable (block 303), the write operation is stored in the PIO input queue 65 (block 331) to await its turn to be sent to the transaction target when it reaches the head or front of the PIO input queue 65 as described below in conjunction with the description of block 313.

Referring back to block 303, if the operation is bufferable (block 303), the buffer and ID check unit 61 also determines whether there are any non-bufferable operations having the same ID as the current bufferable operation already stored within the PIO input queue 65 by inspecting the ID field of the current bufferable operation and comparing it against the ID field of all other operations in the PIO input queue 65 (block 305).

If there are no non-bufferable operations having the same ID, the current bufferable operation is stored within the PIO input queue 65 (block 307) and a corresponding acknowledgement response is stored within the response queue 70 (block 309). The acknowledgement response will be sent to the I/O master that initiated the PIO write operation when the response reaches the head of the response queue 70, which may be well in advance of the actual completion of the corresponding PIO write operation. In addition, the control unit 60 causes the 'R' field in the input queue entry of the current operation to indicate that the corresponding response has already been stored in the response queue 70 (block 311). In one embodiment, the response field 'R' may be implemented as a single bit, which if set, indicates that the corresponding response has been stored in the response queue.

As each operation in the PIO input queue 65 reaches the front or head of the queue, it is sent to the transaction target (e.g., DMA or device interface) (block 313). If there are no errors (block 315) when the write operation completes, a signal that represents an acknowledgement/completion response will be sent by the target device to the PIO unit 36. If there are no errors, the control unit 60 checks the 'R' field of the input queue head entry, which corresponds to the write operation for which the acknowledgment signal was received, to determine whether an acknowledgement response has already been placed in the response queue (block 317). If an acknowledgement response has already been placed in the response queue (block 319), the write operation is considered done and the next transaction in the PIO input queue 65 is moved to the head, and operation proceeds as described above in conjunction with the description of block 313 and/or 301.

If a corresponding response has not already been placed in the response queue 70, as in the case of a non-bufferable transaction or a bufferable transaction that was demoted due to non-bufferable transactions having the same ID already being in the input queue 65, then a corresponding response entry is placed into the response queue 70 (block 321). The write operation is considered done and the acknowledgement response is sent to the I/O master that initiated the PIO write when that response reaches the head of the response queue 70. Operation proceeds as described above in conjunction with the description of block 313 and/or 301.

Referring back to block 315, after each write operation reaches the head of the input queue 65, the control unit 60 waits for a corresponding Ack signal. In the event of an error, either the transaction target or error detect and handling unit 62 may provide an error signal. If an error is present, the error detect and handling unit 62 may check the 'R' field of the entry at the head of the PIO input queue 65 to determine whether a response entry has already been placed in the response queue 70 (block 323). If an entry has not been placed in the response queue 70, a corresponding entry with an error indication is placed in the response queue 70 and that response is sent to the I/O master that initiated the PIO write when that response reaches the head of the response queue 70. Operation proceeds as described above in conjunction with the description of block 313 and/or 301.

However, if an entry has already been placed in the response queue 70 (block 323), the error detect and handling unit 62 may check whether or not the response is still in the response queue 70 (block 327). If the response is still in the response queue 70, the error detect and handling unit 62 may modify the entry by changing the 'E' field to indicate an error has occurred (block 327). On the other hand, if the corresponding response has already been sent to the I/O master that initiated the PIO write, the error detect and handling unit 62 may initiate an interrupt to that I/O master, thereby notifying the I/O master of the presence of an error (block 325). Operation proceeds as described above in conjunction with the description of block 313 and/or 301.

It is noted that that although the operational flow is described and shown in a particular order, it is contemplated that in other embodiments, the operations depicted in the various blocks of FIG. 3 may be performed in a different order, as desired.

Figure 4:
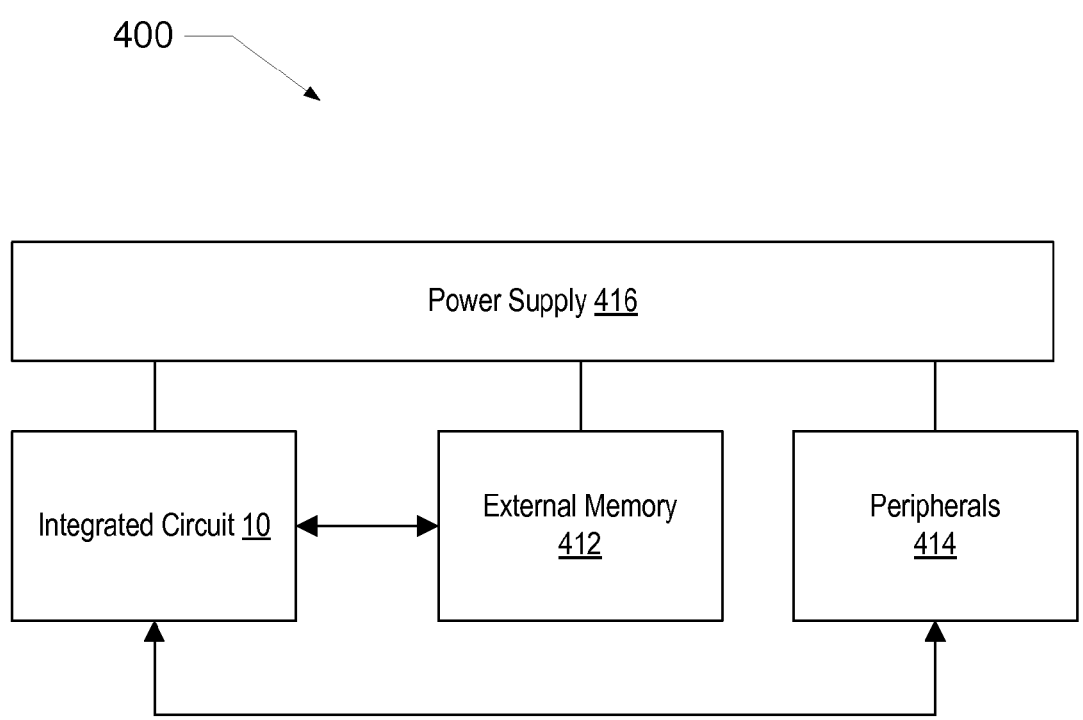
FIG. 4 is a block diagram of one embodiment of a system including the integrated circuit system shown in FIG. 1.

Turning to FIG. 4, a block diagram of one embodiment of a system 400 including integrated circuit system 10 is shown. The system 400 includes at least one instance of the integrated circuit system 10 of FIG. 1 coupled to one or more peripherals 414 and an external memory 412. The system 400 also includes a power supply 416 that may provide one or more supply voltages to the integrated circuit 10 as well as one or more supply voltages to the memory 412 and/or the peripherals 414. In some embodiments, more than one instance of the integrated circuit 10 may be included.

The external memory 412 may be any desired memory. For example, the memory may include dynamic random access memory (DRAM), static RAM (SRAM), flash memory, or combinations thereof. The DRAM may include synchronous DRAM (SDRAM), double data rate (DDR) SDRAM, DDR2 SDRAM, DDR3 SDRAM, etc.

The peripherals 414 may include any desired circuitry, depending on the type of system 110. For example, in one embodiment, the system 400 may be a mobile device and the peripherals 414 may include devices for various types of wireless communication, such as WiFi, Bluetooth, cellular, global position system, etc. The peripherals 414 may also include additional storage, including RAM storage, solid-state storage, or disk storage. The peripherals 414 may include user interface devices such as a display screen, including touch display screens or multi-touch display screens, keyboard or other keys, microphones, speakers, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A programmed input/output (PIO) transaction unit comprising:
an input buffer configured to receive and store a plurality of PIO write operations sent by one or more transactions sources, wherein each PIO write operation includes a source identifier that identifies a respective one of the one or more transaction sources;
a response buffer configured to store response operations corresponding to respective PIO write operations to be transmitted to the transaction source identified by the source identifier; and
a control unit coupled to the response buffer and the input buffer and configured to store in the response buffer a particular response operation corresponding to a given PIO write operation prior to the given PIO write operation being sent to a target of the given PIO write operation in response to determining that the given PIO write operation is a bufferable PIO write operation and that there is no non-bufferable PIO write operation having a same source identifier stored in the input buffer.

2. The PIO transaction unit as recited in claim 1, wherein the control unit is further configured to store in the response buffer, the particular response operation corresponding to the given PIO write operation after the given PIO write operation is sent to the target of the given PIO write operation in response to determining that the given PIO write operation is a non-bufferable PIO write operation.

3. The PIO transaction unit as recited in claim 1, wherein the control unit is further configured to store in the response buffer, the particular response operation corresponding to the given PIO write operation after the given PIO write operation is sent to the target of the given PIO write operation in response to determining that there is at least one non-bufferable PIO write operation having a same source identifier already stored in the response buffer.

4. The PIO transaction unit as recited in claim 1, wherein the control unit is configured to determine whether each PIO write operation is a bufferable PIO write operation based upon an indication in each PIO write operation.

5. The PIO transaction unit as recited in claim 1, wherein in response to detecting an occurrence of an error associated with the given PIO write operation in which a response operation has already been sent to the transaction source, the control unit is configured to initiate an interrupt to the transaction source of the given PIO write operation.

6. The PIO transaction unit as recited in claim 1, wherein the control unit is configured to cause the given PIO write operation to indicate that the response operation corresponding to the given PIO write operation has been stored in the response buffer prior to the given PIO write operation being sent to the target of the given PIO write operation.

7. A programmed input/output (PIO) unit comprising:
an input buffer configured to receive and store a plurality of PIO write operations sent by one or more transactions sources, wherein each PIO write operation includes a source identifier that identifies a respective one of the one or more transaction sources;
a response buffer configured to store response operations corresponding to respective PIO write operations to be transmitted to the transaction source identified by the source identifier; and
a control unit coupled to the response buffer and the input buffer and configured to store in the response buffer a particular response operation corresponding to a given PIO write operation after receiving an associated acknowledgement from a target of the given PIO write operation;
wherein the control unit is configured to store the particular response operation in the response buffer in response to determining that the given PIO write operation is a bufferable PIO write operation and that there is at least one non-bufferable PIO write operation having a same source identifier stored in the input buffer.

8. The PIO transaction unit as recited in claim 7, wherein the control unit is configured to determine whether the each PIO write operation is a bufferable PIO write operation based upon an indicator in each PIO write operation.

9. A method comprising:
storing within an input buffer a plurality of programmed input/output (PIO) write operations received from one or more transactions sources, wherein each PIO write operation includes a source identifier that identifies a respective one of the one or more transaction sources;
storing within a response buffer a response operation corresponding to each respective PIO write operation to be transmitted to a source of the PIO write operation; and
a control unit storing in the response buffer a response operation corresponding to a given PIO write operation prior to the given PIO write operation being sent to a target of the given PIO write operation;
the control unit storing the response operation in the response buffer in response to determining that the given PIO write operation is a bufferable PIO write operation and that there is no non-bufferable PIO write operation having a same source identifier stored in the input buffer.

10. The method as recited in claim 9, further comprising the control unit storing in the response buffer, the response operation corresponding to the given PIO write operation after the given PIO write operation is sent to the target of the given PIO write operation, in response to determining that there is at least one non-bufferable PIO write operation having a same source identifier stored in the response buffer.

11. The method as recited in claim 10, further comprising the control unit determine whether each PIO write operation is a bufferable PIO write operation based upon an indicator within each PIO write operation.

12. The method as recited in claim 9, further comprising the control unit initiating an interrupt to the transaction source of the given PIO write operation in response to detecting an occurrence of an error associated with the given PIO write operation in which a response operation has already been sent to the transaction source.

13. The method as recited in claim 9, further comprising the control unit causing the given PIO write operation to indicate that the response operation corresponding to the given PIO write operation has been stored in the response buffer prior to the given PIO write operation being sent to the target of the given PIO write operation.

14. A system comprising:
one or more input/output (I/O) masters each configured to source programmed I/O (PIO) write operations to one or more I/O devices;
a programmed I/O (PIO) transaction unit coupled between the I/O devices and the one or more I/O masters, wherein the PIO transaction unit includes:
an input buffer configured to receive and store the PIO write operations, wherein each PIO write operation includes an identifier that identifies which of the I/O masters is a transaction source of the PIO write operation,
a response buffer configured to store a response operation corresponding to each respective PIO write operation to be transmitted to the transaction source of the PIO write operation; and
a control unit coupled to the response buffer and the input buffer, wherein the control unit is configured to store in the response buffer a particular response operation corresponding to a given PIO write operation prior to the given PIO write operation being sent to a target of the given PIO write operation in response to determining that the given PIO write operation is a bufferable PIO write operation and that there is no non-bufferable PIO write operation having a same source identifier stored in the input buffer.

15. The system as recited in claim 14, wherein the control unit is further configured to store in the response buffer, the particular response operation corresponding to the given PIO write operation after the given PIO write operation is sent to the target of the given PIO write operation in response to determining that the given PIO write operation is a non-bufferable PIO write operation.

16. The system as recited in claim 14, wherein the control unit is further configured to store in the response buffer, the particular response operation corresponding to the given PIO write operation after the given PIO write operation is sent to the target of the given PIO write operation in response to determining that there is at least one non-bufferable PIO write operation having a same source identifier already stored in the response buffer.

17. The system as recited in claim 14, wherein the control unit is further configured to determine whether each PIO write operation is a bufferable PIO write operation based upon information within each PIO write operation.

18. The system as recited in claim 14, wherein the control unit is configured to detect errors associated with PIO write operations in which a response operation has already been sent to the transaction source, and to initiate an interrupt to the transaction source of the PIO write operations having an error.

19. The system as recited in claim 14, wherein the control unit is configured to cause a particular field within an entry in the input buffer that stores the given PIO write operation to indicate that the response operation corresponding to the given PIO write operation has been stored in the response buffer prior to the given PIO write operation being sent to the target of the given PIO write operation.

20. A system comprising:
an integrated circuit; and
a memory coupled to the integrated circuit;
wherein the integrated circuit includes:
one or more input/output (I/O) masters each configured to source programmed I/O (PIO) write operations to one or more I/O devices; and
a programmed I/O (PIO) transaction unit coupled between the I/O devices and the one or more I/O masters, wherein the PIO transaction unit includes:
an input buffer configured to receive and store the PIO write operations, wherein each PIO write operation includes an identifier that identifies which of the I/O masters is a transaction source of the PIO write operation;
a response buffer configured to store a response operation corresponding to each respective PIO write operation to be transmitted to the transaction source of the PIO write operation; and
a control unit coupled to the response buffer and the input buffer, wherein in response to determining that the given PIO write operation is a bufferable PIO write operation and that there is no non-bufferable PIO write operation having a same source identifier stored in the input buffer, the control unit is configured to store in the response buffer a particular response operation corresponding to a given PIO write operation prior to the given PIO write operation being sent to a target of the given PIO write operation.

* * * * *